Dec. 16, 1930.　　　G. ESTOPPEY　　　1,784,929
AERIAL NAVIGATION INSTRUMENT
Filed April 10, 1926　　　2 Sheets-Sheet 1
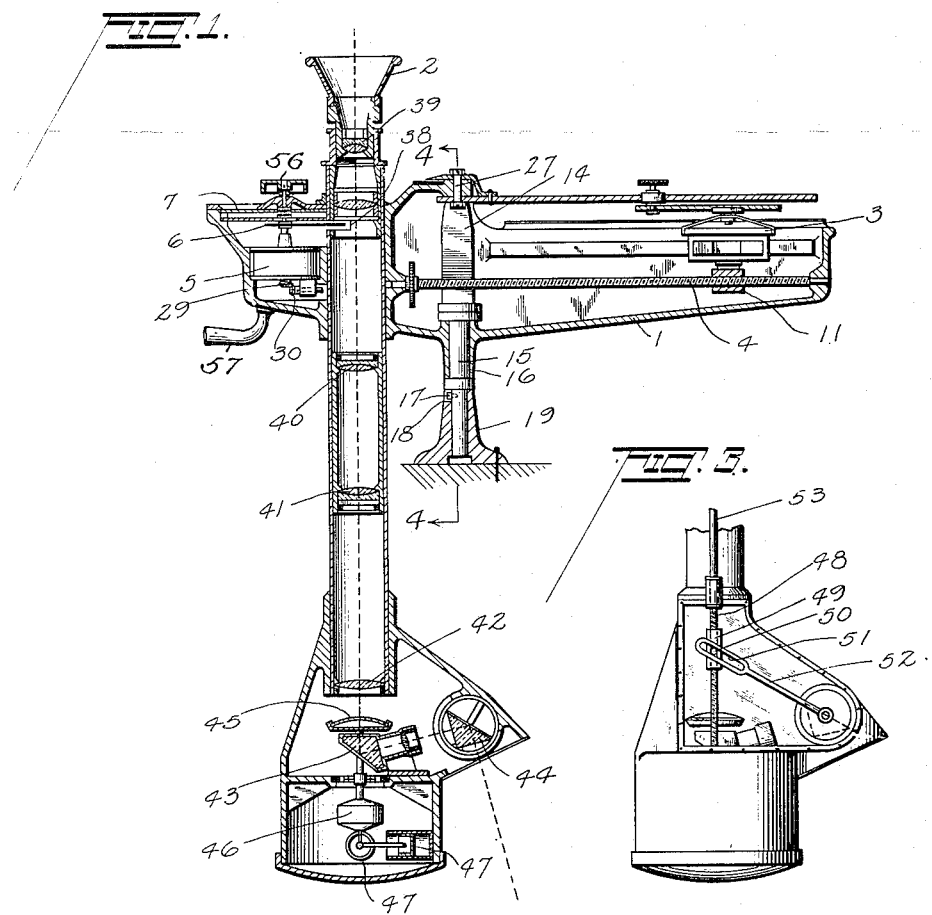
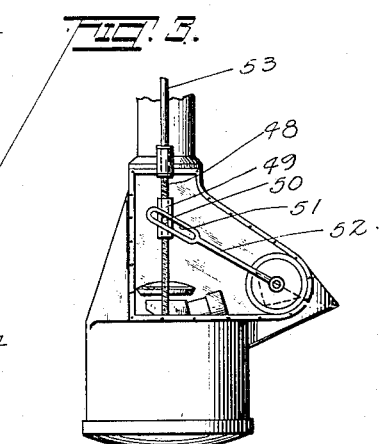
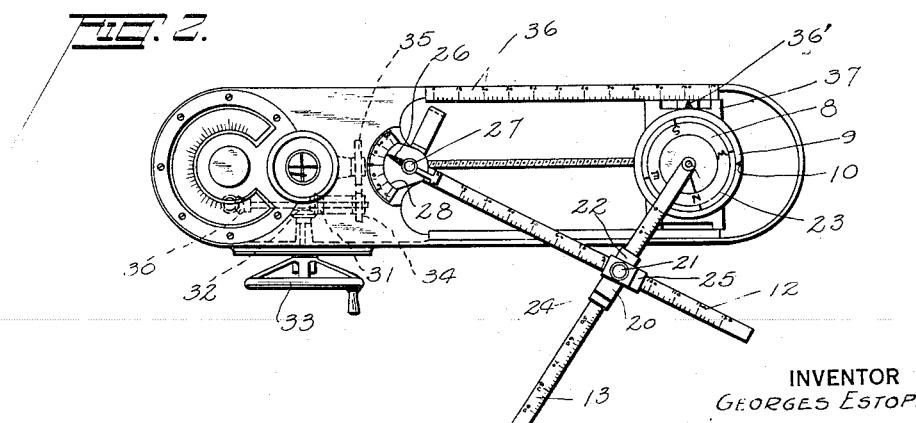
INVENTOR
GEORGES ESTOPPEY
BY
ATTORNEY Dec. 16, 1930.  G. ESTOPPEY  1,784,929
AERIAL NAVIGATION INSTRUMENT
Filed April 10, 1926  2 Sheets-Sheet 2
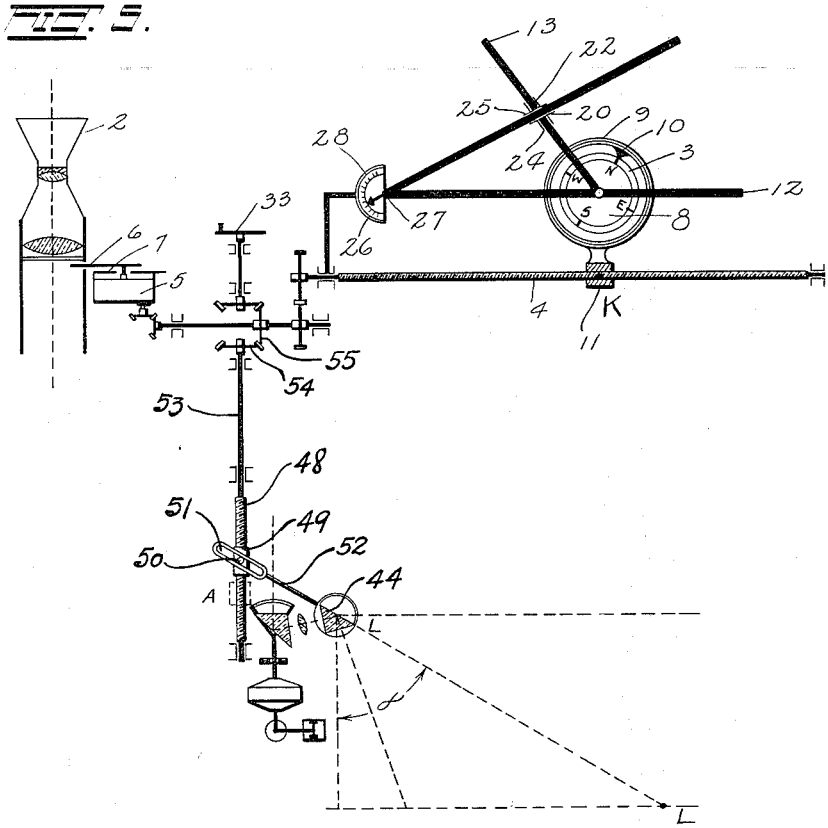
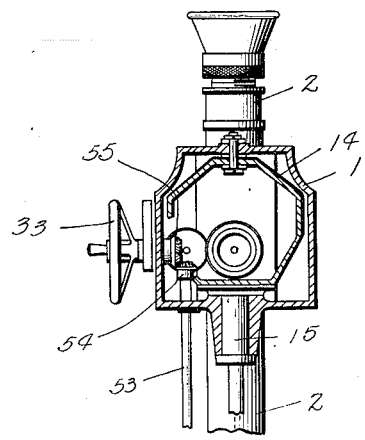
INVENTOR
GEORGES ESTOPPEY
BY Robert L. Young
ATTORNEY Patented Dec. 16, 1930

1,784,929

UNITED STATES PATENT OFFICE

GEORGES ESTOPPEY, OF DAYTON, OHIO

AERIAL NAVIGATION INSTRUMENT

Application filed April 10, 1926. Serial No. 101,121.

This invention relates to an apparatus to be used on aircraft for determining the ground speed, air speed, wind speed and other factors necessary to successfully navigate the aircraft and for determining the factors required for bombing purposes.

The main object of this invention is to provide an apparatus in which the vectors representing the ground, air, and wind speeds are resolved into a mechanical triangle.

A further object of the invention resides in the manner in which this triangle is formed and the mechanical features to effect the same.

Particular emphasis is to be placed on the means embodied herein for determining the angle the ground course makes with the true north, the true direction of the wind and other factors governing flying and bombing calculations which depend on angular measurements.

Briefly stated, the above objects are accomplished by providing three calibrated arms in pivotal relation to one another. The air speed is determined from an extraneous means and the value found set on the air speed arm. The instrument is then aligned with the ground course which operation automatically determines the air speed vector. The ground speed is then determined and in making this determination the ground speed vector is automatically set. This operation further causes the wind speed vector to assume its position. During this operation a magnetic compass is moved to the apex of the triangle from which the relation of the various vectors with the true north can be determined.

It is thus seen that an instrument, such as this invention provides, eliminates the manual setting of the various vectors, is certain of operation, and very efficient, in that the vectors assume their respective positions simultaneously. I am aware that there are other devices for accomplishing the same object, in part, as this invention, such as the device disclosed by the U. S. patent to Pollen et al. 1,314,428, but that device is objectionable due to the necessity for manual operation and its resulting slowness of operation.

With the above objects and advantages in view and which will be more fully set forth as the description of my invention proceeds; reference, for a full understanding, is had to the accompanying drawings in which:

Fig. 1 is a central section through the instrument.

Fig. 2 is a plan view thereof.

Fig. 3 is a partial view showing the bottom of the telescope.

Fig. 4 is a part sectional view of the eye piece and of the telescope, and

Fig. 5 is a schematic drawing showing the mechanism of the instrument.

The device consists in the main of a housing 1, and a telescope 2. The housing contains a compass 3 slidably mounted in the forward end thereof on a micrometric screw 4 to be described later. Fixedly mounted in the rear thereof is a watch or timing element 5 for the purpose of rotating an altitude indicator 6 at a predetermined speed. This indicator is adjustable with reference to a dial 7 for altitude calibrated in some convenient unit. The compass, heretofore mentioned, possesses a graduated disc 8, the index number of which is directed toward the magnetic pole. A ring 9 pivotally mounted on the compass moves around the compass cover and has scribed thereon an index 10. The compass is operated by the micrometric screw 4, engaging a nut 11. Comprising a part of the housing 1 are two bars movable with reference to one another; namely, an airspeed bar 12 and a wind speed bar 13. The airspeed bar 12 is rigidly fixed to the aircraft and parallel to the axis thereof, by a support 14 which is fixed to a stud 15 which in turn is fixed to a support 19 by which the whole apparatus is attached to the aircraft. A stop screw 17 and slot 18 are provided for assembly purposes and for drift angle determination. The wind speed bar 13 slides in the sliding member 20 which pivots about the stud 21 fixed to the sliding member 22 which slides along the airspeed bar 12. The other end of the wind speed bar pivots about the stud 23 fixed to the compass 3. The wind speed bar has a vernier or index 24 fixed at one end of the sliding member 20, and the air speed bar has an index 25 fixed to one end of the sliding member 22. An index 26 fixed to the bar 12 and pivoting about axis 27 indicates the drift angle on a dial 28 fixed to the housing 1. The watch or timing element 5, as was before mentioned, is fixed in the housing 1 and is wound through bevel gears 29 and 30 connected to bevel gears 31 and 32 which are operated by the use of a hand wheel 33, the use of which will be described later on. On the same shaft with the gears 30 and 31, and operated at the same time, is the gear 34 which meshes with another gear 35 as in Fig. 2 fixed to and rotating the micrometric screw 4. A ground speed bar 36 is mounted parallel to the axis of the micrometric screw 4 and at the one side of the housing 1 and is rotatable with the housing about the stud 15 as an axis. An index 36' mounted on the one side of a sliding member 37 integral with the compass indicates ground speed on the scale on the ground speed bar 36.

The ground speed is determined by observing an object on the ground thru the telescope 2, which consists of a telescope housing fixedly mounted in the rearmost portion of the housing 1 and adjacent the watch 5. An opening 38 cut in the side of the telescope permits the indicator 6 of the watch to pass in the sighting field of the telescope. A series of lenses 39, 40, 41 and 42 are mounted at intervals in the telescope, which are focused upon a movable reticle 45 which indicates upon a fixed prism 43 operating in conjunction with a movable prism 44, by which means an object can be sighted on the ground. The reticle 45 is mounted on a stabilizer 46 dampened by dashpots 47.

The movable prism 44 is moved by a driving mechanism consisting of a vertical micrometric screw 48 and a nut 49, said nut having a stud 50 mounted therein. This stud operates in a guideway 51 at the one end of a lever 52; the other end of said lever being attached to the movable prism. The vertical micrometric screw is integral with a vertical shaft 53, said shaft having mounted at the top end thereof a bevel gear 54 meshing with another bevel gear 55 which is attached to the hand wheel 33. In this manner both the horizontal micrometric screw 4 and the vertical screw 48 can be operated at the same time by the hand wheel.

By the mechanism described it is possible to resolve the vectors of the ground speed, air speed, and wind speed into a mechanical triangle which is accomplished in the following manner:

The apparatus is set for the operation by placing the pivot of the compass 3 directly beneath the pivot of the drift angle scale 28 on the axis as the stud 15. The air and wind speed bars are superposed on one another when the compass is in this position and parallel with the ground speed arm. Any object is then sighted thru the telescope, and the housing 1 moved by a handle 57 until the object is moving parallel with the axis of the instrument, i. e., parallel with the ground speed arm. Since the air speed bar is rigidly fixed to the aircraft and in a line parallel to the axis thereof it will be seen that the air and wind speed arms will remain in their superimposed position relative to one another during this operation and will pivot about points 15, 27 and 23 as an axis. The drift angle at this time may be read from the drift scale 28. The next step is to set the index 25 of the air speed bar in accordance with the air speed of the aircraft, the value for said setting being determined by extraneous means. This is accomplished by moving knob 21 along the air speed bar until the proper setting is attained, the vernier on the wind speed bar sliding with the same. Thus the direction and quantity of the air speed vector is attained.

The needle 6 of the clock 5 is then set on the dial to correspond with the altitude of the airplane by turning the knob 56 mounted on top of the watch. At this time, the nut 49 which regulates the position of the movable prism 44 is at position "A" shown in dotted lines on the micrometric screw, as will be seen by observing Fig. 5. Sighting line L—L at this time makes an angle α with the vertical and the vertical axis of the compass 3 and corresponds with the axis of the stud 15. The nut 11 of the micrometric screw 4 is also coincident therewith. It is not necessary to follow the steps in the order as given, it being sufficient if the instrument is set as is now set forth which is in condition to determine the ground speed vector.

To do this an object is picked up thru the telescope which is passing along the ground course. When said object passes in the sight line L—L, the hand wheel 33 is turned and the watch started simultaneously. The telescope is synchronized with the movement of the object on the ground by turning the wheel 33 at the required speed and continued in this way until the pointer 6 of the watch passes in the sighting field of the telescope, when the cranking of the wheel 33 is discontinued.

As the wheel 33 is being turned the nut 11 is being moved forward by means of mechanical connections as described, and with said nut the compass and ground speed index are being moved. After the cranking has been discontinued the ground speed may be read from the setting of the index on the ground speed scale and ground direction by reference to the compass.

By this operation, the last vector, the wind speed is found. As the compass 3 and nut 11 are being moved the wind speed bar is caused to assume the position shown in Fig. 5. As the compass 3 has been displaced from its original position to position K, so also has the wind speed bar has been displaced, as it is pivotally mounted at its one end to the compass and slidably mounted on the air speed bar. The direction and quantity of this wind speed vector is now determined merely by noting the angle which it makes with the ground speed bar or by reference to the compass and by reading the setting of the index.

By merely examining the various indicating means of the instrument, the ground speed can be read, the drift angle, the air speed and the wind speed and due to the fact that the compass has been moved forward with the ground speed index, a comparison of the vector arms with the magnetic needle indicates the true direction of the wind with reference to magnetic direction, the true course of the aircraft, i. e., the ground course and the drift angle in terms of north and south.

Having thus fully described my invention what I claim as new and desire to protect by Letters Patent of the United States is:

1. An instrument for determining automatically the relation between the ground speed, air speed and wind speed vectors for a moving craft comprising means for resolving the vectors of the various speeds into a mechanical triangle, said means comprising a vector arm for the air speed, a support for permanently fixing said arm to the air craft, parallel to the fore and aft axis thereof, there being an air speed scale thereon and frictionally slidable index therefor, a vector arm for the ground speed, said arm being movable about the air speed arm support as an axis, there being a scale thereon and a slidable index therefor, a vector arm for the wind speed, a scale and slidable index therefor, said wind speed index being pivotally attached to the air speed index, said wind speed arm being pivotally mounted on the ground speed index, means for aligning the ground a speed vector with the ground course and rotatable means for determining the ground speed, said means synchronously actuating the ground speed index.

2. In an instrument of the class described for aircraft, the combination of a supporting member fixed to the aircraft, an air speed arm fixed to said support, parallel to the fore and aft axis of the aircraft and having graduations thereon for indicating air speed, a slidable index thereon, a wind speed arm having graduations thereon for indicating wind speed, a slidable index therefor, said index being pivotally mounted on the air speed index, a ground speed arm pivotally mounted on the air speed support as an axis, a slidable index therefor on which said wind speed arm is pivotally mounted, and means for determining the ground speed, said means actuating the ground speed index which in turn causes the various arms to assume a triangle proportional in value and direction to the speed which they represent respectively.

3. The combination as set forth in claim 2 characterized by having a graduated scale supported by the ground speed support and movable with the ground speed arm when the ground course is determined for indicating the drift angle.

4. The combination as set forth in claim 2, a magnetic compass carried by said ground speed index.

5. In an instrument for aircrafts, the combination of a support, an air speed scale attached to the support parallel with the fore and aft axis of the aircraft, a housing revolvable about said support, a ground speed scale carried by said housing, a wind speed scale, a slidable index for each scale, said ground speed index being at zero when it is coincident with the axis of revolution of the housing and carried by a micrometric screw extending longitudinally of said ground speed scale, said wind speed scale being pivotally mounted at one end, on the ground speed index and pivotally and slidably carried by the air speed scale, a telescope for aligning the axis of said instrument with the ground course, means operable in the telescope for determining the ground speed, comprising a micrometer screw, means connecting said screw with the ground speed micrometer screw whereby said ground speed index is moved synchronously with said first-mentioned micrometer screw.

6. An instrument for determining automatically the relation between the ground speed, air speed and wind speed vectors for a moving craft comprising means for resolving the vectors of the various speeds into a mechanical triangle, said means comprising a vector arm for the air speed, a support for permanently fixing said arm to the aircraft parallel to the fore and aft axis thereof, there being an air speed scale thereon and an index slidable therealong, a vector arm for the ground speed, said arm being movable about the air speed arm support as an axis, there being a scale thereon, a magnetic compass slidable along said ground speed arm and providing a slidable index for giving indications of ground speed on said ground speed scale, a vector arm for the wind speed, a scale and a slidable index therefor, said wind speed index being pivotally attached to the air speed index, said wind speed arm being pivotally mounted on the ground speed index, means for aligning the ground speed vector with the ground course and rotatable means for determining ground speed, said means synchronously actuating the ground speed index along its arm.

7. An instrument for mechanically simulating the air-ground-wind-speed triangle of an aircraft and for indicating the true relation of the aircraft with the magnetic north comprising interconnected arms of variable effective length for representing the various component velocities, means for determining the ground speeds, means interconnecting said first-named means and the ground speed arm whereby the side of the triangle representing such speed is automatically set up as the ground speed is determined and a compass at the apex of said ground speed and wind speed arms.

8. An instrument for mechanically simulating the air-ground-wind-speed triangle of an aircraft and for indicating the true relation of the aircraft with the magnetic north comprising interconnected arms of variable effective length for representing the various component velocities, means for determining the ground speeds, means interconnecting said first-named means and the ground speed arm whereby the side of the triangle representing such speed is automatically set up as the ground speed is determined and a magnetic compass actuated simultaneously by said ground speed determining means to assume a position at the apex of said triangle.

9. An instrument for mechanically simulating the air-ground-wind-speed triangle of an aircraft comprising interconnected arms of variable effective length for representing the various component velocities, means for determining the ground speed, and means interconnecting said first-named means and the ground speed arm whereby the side of the triangle representing such speed is automatically set up as the ground speed is determined.

10. An instrument for determining automatically the relation between the various speed vectors for a moving craft comprising means for resolving the vectors of the various speeds into a mechanical triangle, said means comprising vector arms graduated and pivotally associated and including a ground-speed arm, means for determining the ground speed, and means comprising an index for indicating the ground-speed on said ground-speed arm and for interconnecting said arm and the wind speed arm whereby the length of the side of the triangle representing the ground-speed is automatically set up as the ground-speed is determined.

In testimony whereof I affix my signature.

GEORGES ESTOPPEY.